March 4, 1952 G. W. BORKLAND 2,587,814
METHOD AND APPARATUS FOR MAKING A FIBROUS PREFORM
Filed Nov. 9, 1946 2 SHEETS—SHEET 1
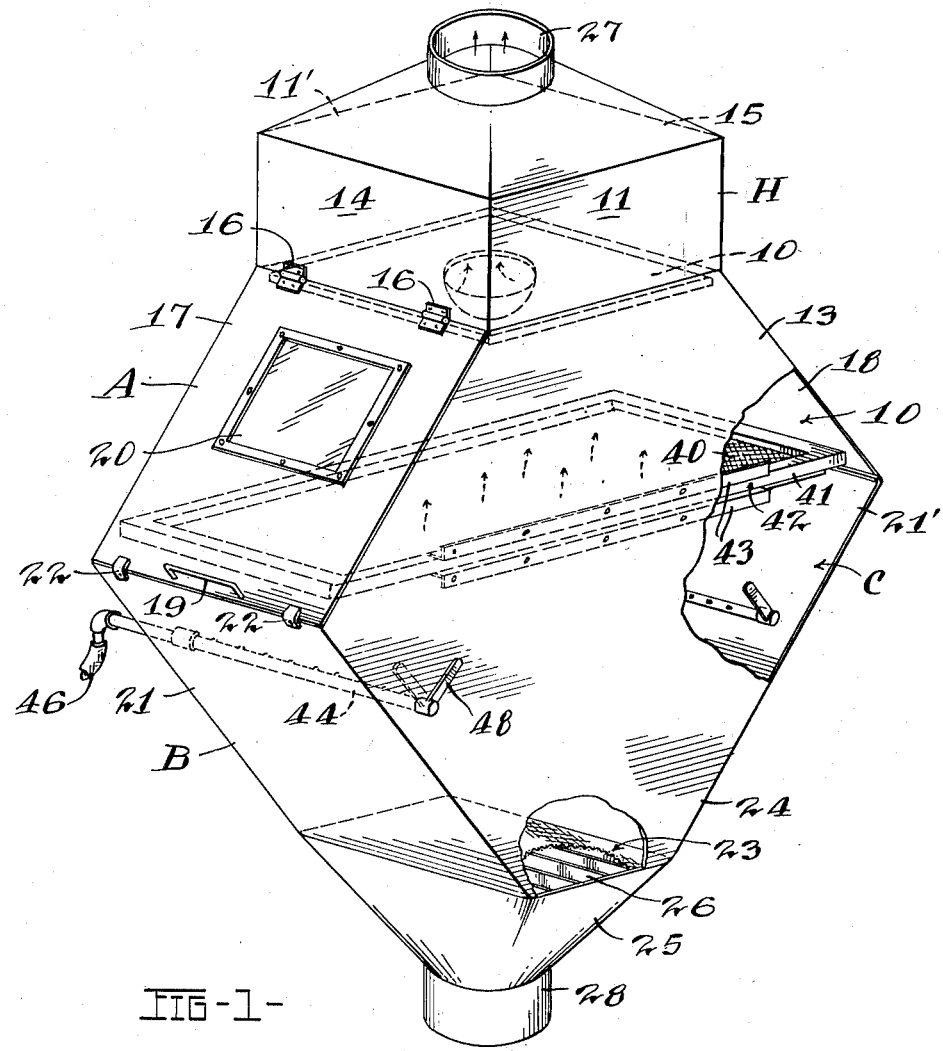
FIG-1-
INVENTOR.
GUSTAVE W. BORKLAND
BY
*Staelin & Overman*
ATTYS.

March 4, 1952 G. W. BORKLAND 2,587,814
METHOD AND APPARATUS FOR MAKING A FIBROUS PREFORM
Filed Nov. 9, 1946 2 SHEETS—SHEET 2
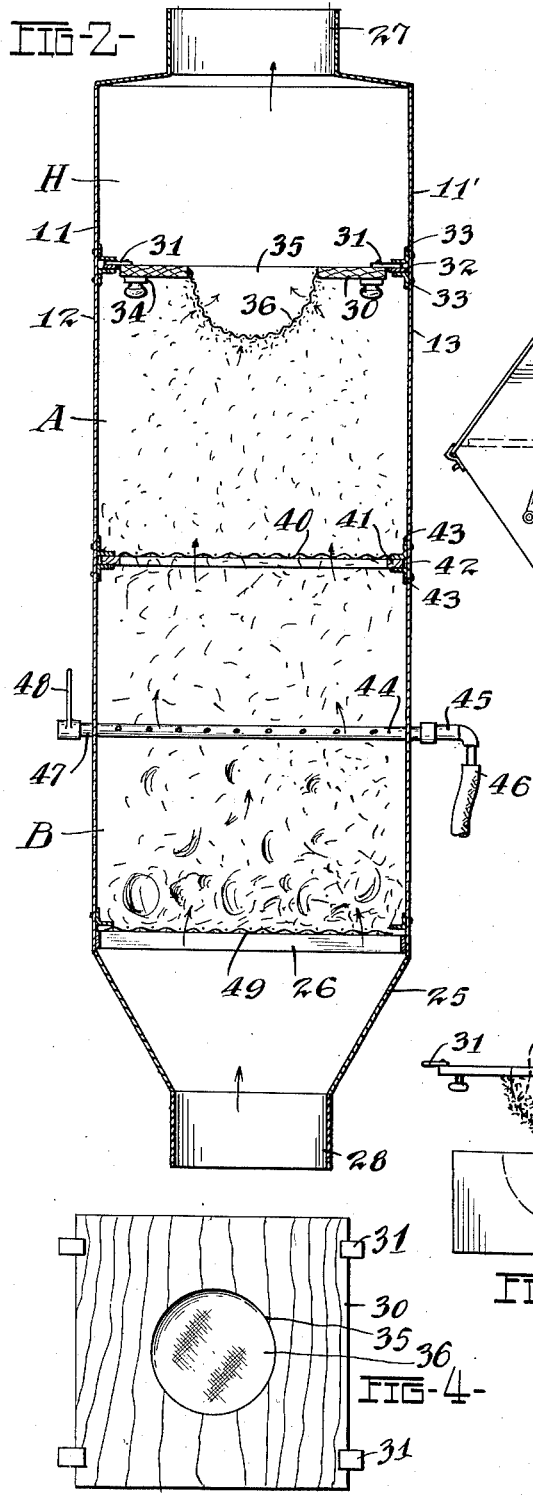
INVENTOR.
GUSTAVE W. BORKLAND
BY
ATTYS.

Patented Mar. 4, 1952

2,587,814

UNITED STATES PATENT OFFICE 2,587,814

METHOD AND APPARATUS FOR MAKING A FIBROUS PREFORM

Gustave W. Borkland, Marion, Ind., assignor to Owens-Corning Fiberglas Corporation, a corporation of Delaware Application November 9, 1946, Serial No. 708,998

16 Claims. (Cl. 19—148)

This invention relates to reinforcing amorphous material and particularly to a shaped mass of intermatted fibers for reinforcing resins and the like, the mass being sufficiently self-sustaining to endure normal handling. It relates also to the production of the mass.

In the plastics and related art, considerable reduction in the cost of molded plastics and many improvements in their physical and chemical properties often result from the incorporation of various fillers with the resinuous materials. Noticeable reduction in costs are obtained from the use of wood flour, alpha cellulose, organic and mineral wastes and the like, but unless these fillers are of fairly long fiber length, improvements in strength characteristics are generally not obtained. Exceptionally strong resinous reinforced plastics are produced if the fillers are long fibered, and particularly if the fibers in themselves are of high strength, as in the case of glass fibers. The inertness of the glass fibers also effect other improvement in the plactics in which they are incorporated, these include weather, chemical and moisture resistance, heat resistance, color stability and dimensional stability.

Sometimes, long fibered fillers of the type described are directly incorporated with the resinous materials in the compounding process. However, in such instances, mastication and homogenization so work the long fibers as to reduce their length, to effect proportionately the strength of the resulting molded article. In addition, the incorporated long fibrous fillers impair the flow of the molding compound to the extent that the molding cavity often is not filled, even under substantially high molding pressures. Thus, in order to gain the advantages in the use of long fiber fillers it is expedient to incorporate them as a reinforcing fabric preshaped substantially to conform to the contour of the mold so that the impregnated fibers will have but a short distance to move to form a complete, void-free molded article.

A simple means for fabricating a fibrous fabric having uniform fiber distribution and sufficient strength to resist the stresses incident to normal handling, is to weave the fibers into a textile cloth to be resin impregnated subsequently and formed under pressure or the combination of heat and pressure to the desired shape. However, the weaving of a textile cloth, which manifestly is an intermediate article of manufacture, adds to the ultimate costs, and there is contemplated a considerable reduction in filler costs if a suitably shaped mat of the fibers could be readily formed from the relatively low cost discontinuous fibers themselves.

Uniform fiber distribution and interfelting with sufficient mass integrity to hold the fibers in their predetermined arrangement is difficult to obtain, especially when manual means are employed. Some relatively slow automatic settling means responsive to gravitational forces have been devised to produce a substantially flat sheet of uniformly distributed glass fibers, but increasing difficulties arise in the fabrication of a uniform fabric of felted fibers arranged in a form having a complex curvature.

It is an object of this invention to produce a fabric of intermatted fibers having a predetermined contour and fiber distribution.

Another object of this invention is an improved method of collecting a uniformly distributed felted mass of discontinuous glass fibers on a removable form of complex curvature.

A further object is a machine comprised of relatively few simple parts and operable by unskilled labor rapidly to fabricate removable preforms of discontinuous felted fibers in uniform jackstraw arrangement which are adapted particularly as a resinous reinforcement in plastics.

These and other objects of this invention will hereinafter appear, and for purposes of illustration but not of limitation, an embodiment of the invention is shown on the accompanying drawings, in which:

Figure 1 is a perspective view of the preform fabricating machine comprising this invention;

Figure 2 is a sectional elevational view taken longitudinally through the machine illustrated in Figure 1, showing the separating plate in one position of adjustment;

Figure 3 is a side elevational view of the duct work and fan for use in connection with the fabricating machine;

Figure 4 is a top view of the separating plate with the attached foraminous separating member;

Figure 5 is a cross sectional view showing the fiber mat collected on the foraminous member in position for depositing the mat in a mold cavity; and Figure 6 illustrates one use of the preformed fibrous fabric as a reinforcement for molding plastic formed by the pool process of resin distribution.

In one aspect this invention relates to the manufacture of contoured fabrics of discontinuous fibers by means of the recirculation of a stream of air at a relatively high velocity through an enclosed chamber so that fibers separately or in the form of strands are entrained in the air stream near the inlet port and are carried thereby to the outlet where a pervious or foraminous member separates the fibers from the air stream. Baffles and screens are provided in the chamber to distribute uniformly the air currents in turbulent movement and to control the amount of entrained fibers so that uniform fiber distribution is obtained in the air stream, and on the separating member. Fibers deposited in the manner described are sufficiently intertangled with each other and the foraminous member to comprise a felted fabric having sufficient mass integrity to enable the removal of the composite structure from the chamber for use of the felted fabric as a resinous reinforcement, insulation, or for other purposes, as hereinafter described.

Although description hereinafter is specifically directed to the formation of a fibrous fabric for resinous reinforcement purposes, it is to be understood that the fibrous fabric may equally be applied as an insulation in which the fibers are aided in the retention of their predetermined arrangement by resins incorporated in the air stream and deposited onto the fiber surfaces, or else by spraying a solution, emulsion or dispersion of the bonding material onto the fiber surfaces when separated from the machine. In addition, numerous other applications may be made of a preshaped mat of discontinuous fibers.

Applicable to this invention are fibers formed of glass, asbestos, cellulosic material, synthetic organic resins, or the ordinarily used organic textile fibers of wool, cotton, silk, hemp or the like. Particular emphasis is placed on glass fibers for the material is known to impart advantageous characteristics to the finished article.

Referring now to the drawings, a pair of frustopyramidal compartments A and B are joined at their base to provide a chamber C open at the upper and lower ends. The opening 10 in the upper compartment A is closed by a hood H of sheet metal or the like having its side walls 11 and 11' joined to the upper edge of the side walls 12 and 13 of the upper chamber as by riveting, soldering, brazing or the like, so that a substantially air tight juncture is obtained. Each of the end walls 14 and 15 of the hood have secured thereto a pair of hinges 16 for pivotally mounting end walls 17 and 18 of the upper chamber in a manner enabling the same to be rocked as a door to the open or closed position. Each end wall 17 and 18 is provided with a handle 19 enhancing manual manipulation thereof, and an observation window 20 in each enables visual determination of the course of the fabrication process.

The pivotally mounted end walls 17 and 18 are releasably secured to the abutting end walls 21 and 21' of the lower compartment by means of brackets 22. An opening 23 in the base 24 of the lower compartment is closed by a funnel 25 of sheet metal or the like, having therein multiple upright vanes 26 arranged in a manner uniformly to direct entering air currents throughout the chamber. Tubular ducts 27 and 28 join the upper hood H and the lower funnel 25 respectively to a fan 29 disposed in the duct structure, hereinafter to be described.

A rigid rectangular plate 30 of wood, plywood, sheet metal or the like, is dimensioned so as completely to separate the hood H from the upper compartment A. In the assembled position, laterally extending ears 31 on the plate 30 rest on the shelves 32, provided by flanged channels 33, which depend from the lateral walls of the hood H in a manner releasably to hold the plate in abutment with the underside of the hood and effectively to militate against lateral relative shifting movement of the plate. Obviously the plate may be positioned on the shelves 32 or removed from the enclosing chamber C through either of the pivotally mounted doors 17 or 18. Knobs 34 are provided to facilitate the movements thereof to and from the engaged position.

One or more openings 35 through the plate are closed by foraminous members 36 formed of metal screening or other like rigid pervious materials adapted to retain the shape imparted thereto which conforms substantially to the contour of the desired fabric form.

Separating the upper compartment A from the lower B is a removable foraminous member 40 in the form of a wire screen netting, or aligned vanes housed in a suitable frame 41 of suitable rigid material. The member 40 is so dimensioned as slidingly to engage grooves 42 in the housing side wall provided by a pair of spaced horizontally disposed parallelly arranged flanges 43 secured to the central portion of each side wall of the lower compartment. The length of the frame preferably is arranged to be less than the length of the chamber in the same area, thus to be spaced from each end wall when in the assembled position. Manifestly, screens may selectively be positioned therein having a mesh size adapted readily to control the rate of filtration therethrough of the fibers of a predetermined length.

For purposes of removing the matted fibers from the bottom of the screen when the air currents are relaxed, and to enhance the fiber distribution throughout the blowing operation, a pair of pivotally mounted tubular members 44, having multiple openings therein, are disposed transversely through the chamber along each lateral end wall 21 and 21'. The ends thereof project from the side walls, one end 45 of each being coupled to a flexible hose 46 providing a passage in connection with an air pressure source. The other end 47 is provided with a lever 48 to facilitate the rotational movement of the tubular member by the operator for purposes previously pointed out, or for causing the scattered fibers to be disposed near the air stream inlet so as more readily to be entrained. Another screen 49 is positioned over the funnel 25 to militate against the passage of fibers into the funnel housing.

Normally the air stream enters the chamber from the duct 28 and is exhausted from the chamber through the upper duct 27. Thus, if the upper duct is connected to the fan inlet 50 and the lower duct is connected to the outlet port 51, complete recirculation is attained so that unseparated fibers are reinjected into the chamber and remain in the system. Not infrequently, it may be desirable to circulate the air stream in the opposite direction, or else it may be preferable to use a predetermined percentage of fresh air, and for such purposes other duct work is provided. For example duct 52 associates the funnel 25 with the fan inlet 50 and duct 53 connects the duct 27 with the fan outlet 51. Shutters 54, 55, 56 and 57 are provided selectively to open or close various ducts to obtain the air flow desired. Shutter 57 associates the fan inlet with the atmosphere, and when certain small fiber lengths are used, the fibers may be continuously fed therethrough with the air into the chamber to replace those removed as a fibrous fabric.

In normal operation, a quantity of discontinuous separated glass fibers, or a quantity of strands of glass fibers, having the desired fiber or strand length (usually 1 to 3 inches), are deposited in the chamber through either of the pivotally mounted end walls or doors 17 or 18. Through the same door, the separating plate 30 is positioned on the shelves 32 so that the foraminous contoured member extends preferably downwardly into the upper compartment A, as illustrated in Figure 2. Thereafter, the hinged door is closed substantially to provide an air tight chamber.

When the circulating fan is rendered effective, air currents of relatively high velocity are directed upwardly through the funnel 25, the glass fibers or strands are entrained and carried in the upwardly direction. The greater portion of the air currents are directed by the vanes 26 toward the separating screen 40 which in combination with the turbulent air currents further effects the separation of the fibrous bundles which might be formed and entraps a great majority of the swirling fibers, but permits a controlled proportion to pass therethrough forming a cloud of uniformly distributed glass fibers suspended in turbulent movement of air currents in the upper chamber. A small part of the air stream passes upwardly beyond the longitudinal ends of the separating screen 40 carrying a small amount of entrained fibers and operates to add to the turbulence.

As previously described, the fan 29 withdraws the air from the upper chamber A, through the foraminous member connecting the upper compartment with the hood, and into upper duct work leading to the fan inlet. The foraminous member permits the air currents to pass therethrough, but effectively separates out the entrained glass fibers which deposit on its outer surface as a felted mass having some degree of self sufficiency in cooperation with the foraminous member.

Obviously, if the fiber deposition varies so that sections of thick and thin wall thickness are produced, the resistance to fluid flow is so reduced in the area of thinner wall sections that greater portions of the air stream pass therethrough, thereby to deposit a greater amount of glass fibers in that area, until ultimately the fiber distribution is substantially equal as measured by the equalization of air passage resistance. The thickness of the fiber mat may be controlled by the variation of the amount of air circulation to form a fabric of desired thickness having the fibers in a condition of arrangement, commonly known as jackstraw arrangement.

Not infrequently, the fibers are so entrapped by the separating screen 40 that filtration therethrough into the upper chamber is substantially restricted. When this occurs, it is expedient to render the circulating fan ineffective and enable the fibers to fall from the bottom of the screen 40 aided by the tubular air jets 44.

When the desired mass of intermatted glass fibers has been collected on the foraminous member, the fan is rendered ineffective and the plate 30 is removed from the chamber A. Although the gathered fibers in themselves do not have the characteristics to impart self-sustaining qualities to the mass, they are so interlocked and associated with the foraminous member that sufficient mass integrity is provided in combination therewith to enable movement from place to place.

Electrical charges not infrequently are formed which influence the relative position of each fiber on the foraminous member and the adherence thereto and to each other. However, when the plate is tapped, the intermatted fibers are readily disengaged from the foraminous member as a mat, so that disposition in a molding cavity 55 is readily effected for subsequent use as a plastic reinforcement or a resinous bonded insulation material.

Conventional molding methods may be used to impregnate the fabric completely, such, for example, as the pool process wherein a measured amount of liquid resin 56 is deposited within the molding cavity 55, and when the male member 57 is brought in contact therewith, the liquid resin is forced upwardly into the interstices of the fiber fabric to form a substantially void-free molded article under heat and pressure. The freed separating plate 30 or other similar plates may be again positioned in the chamber to provide a substantially simple but rapid process for fabricating fibrous preforms.

Although reference has been to a preformed fabric of general contour, it is understood that preforms of complex curvature and deep draws may also be made. It is evident that the plate 30 may be positioned to dispose the foraminous member in the hood section, thus to collect the fabric of glass fibers on the concave surface, the preform thus being adapted to be deposited on a male mold member.

It is manifest that I have produced a new and novel machine for fabricating a preshaped mass of discontinuous fibers of glass or the like in a simple and easy manner, not requiring the use of skilled labor, excessive time, or expensive machined parts. Units of the type described are readily formed of simple sheet metal sections or the like, to comprise an efficient fabricating unit which can be made available to any plastic fabricator or processor.

In addition, I have disclosed a new and simple means for fabricating a preformed mass of discontinuous glass fibers in jackstraw arrangement for subsequent use as a resinous reinforcement, insulation mat or the like. The simplicity of manufacture effectively lowers the ultimate cost of articles molded therefrom wherein the strength, chemical resistance, heat resistance, clarity, dimensional stability, and weather resistance are of importance, necessitating the use of relatively long fibers.

It is to be understood that other changes in the details of construction, arrangement and operation may be effected without departing from the spirit of the invention especially as defined in the appended claims.

I claim.

1. Apparatus for fabricating an intermatted mass of glass fibers of predetermined shape comprising an enclosing chamber having air outlet and inlet ports at the top and bottom respectively, a stationary foraminous member of the predetermined shape adapted replaceably to cover said outlet opening, means for supplying glass fibers to the chamber, means for directing turbulent air flow from the inlet through the outlet port of the chamber whereby the glass fibers are entrained and carried by the air in opposition to gravitational forces to be deposited in an intermatted mass on the foraminous member as the air passes therethrough to the outlet.

2. Apparatus for fabricating a preform of discontinuous glass fibers in intermatted relation comprising an enclosing chamber having air outlet and inlet ports at the top and bottom respectively, a foraminous member corresponding in contour to the shape of the preform adapted replaceably to cover the outlet port, a door forming a part of said chamber in the region of the outlet port to enable access to said foraminous member, means for supplying glass fibers to the chamber, means for directing rapid air flow through the chamber from the inlet through the outlet port, and means within the chamber for imparting turbulence to the air as a result of which the fibers are entrained and uniformly distributed therein and deposited on the foraminous member in an intermatted layer as the air passes therethrough to the outlet port.

3. Apparatus for fabricating a preform of discontinuous glass fibers in haphazard arrangement comprising an enclosing chamber having air outlet and inlet openings at the top and bottom respectively, a foraminous member corresponding in contour to the shape of the desired preform adapted replaceably to cover the outlet opening, means for supplying glass fibers to the chamber, means for directing a rapid flow of air through the chamber from the inlet through the outlet opening, means for imparting turbulence to the rapidly moving air within the chamber whereby the fibers are entrained and carried in the direction toward the outlet opening to be deposited on the foraminous member as the air passes therethrough to the outlet, and a screening member extending across the enclosing chamber in spaced relation with the side walls thereof intermediate the outlet and inlet ports to aid the distribution of the fibers and imparting additional turbulence to the air stream.

4. Apparatus for fabricating a preform of discontinuous glass fibers in haphazard arrangement comprising an enclosing chamber having air outlet and inlet openings at the top and bottom respectively, a foraminous member corresponding in contour to the shape of the desired preform adapted replaceably to cover the outlet opening, means for supplying glass fibers to the chamber, means for directing a rapid flow of air through the chamber from the inlet through the outlet opening, means including the shape of the chamber and elements disposed therein for imparting turbulence to the rapidly moving air within the chamber whereby the fibers are entrained and carried in the direction toward the outlet opening to be deposited on the foraminous member as the air passes therethrough to the outlet, said means for imparting turbulence to the air stream including also vanes associated with the inlet opening to direct the flow of air in predetermined directions.

5. Apparatus for fabricating a preform of discontinuous glass fibers in haphazard arrangement comprising an enclosing chamber having air outlet and inlet openings at the top and bottom respectively, a foraminous member corresponding in contour to the shape of the desired preform adapted replaceably to cover the outlet opening, means for supplying glass fibers to the chamber, means for directing a rapid flow or air through the chamber from the inlet through the outlet opening, means including elements disposed within the chamber for imparting turbulence to the rapidly moving air within the chamber whereby the fibers are entrained and carried in the direction toward the outlet opening to be deposited on the foraminous member as the air passes therethrough to the outlet, said means for imparting turbulence to the air stream including revolvable air jets within said chamber adapted to direct air streams in angular relation with the flow from inlet to outlet openings.

6. Apparatus for fabricating a preform of discontinuous glass fibers in haphazard arrangement comprising an enclosing chamber having air outlet and inlet openings at the top and bottom respectively, a foraminous member corresponding in contour to the shape of the desired preform adapted replaceably to cover the outlet opening, means for supplying glass fibers to the chamber, means for directing a rapid flow of air through the chamber from the inlet through the outlet opening, means within the chamber for imparting turbulence to the rapidly moving air within the chamber whereby the fibers are entrained and carried in the direction toward the outlet opening to be deposited on the foraminous member as the air passes therethrough to the outlet, a screen disposed intermediate the outlet and inlet ports to aid the distribution of the fibers suspended in the turbulent air stream, said means for imparting turbulence including revolvable air jets adjacent the underside of the screen for directing air streams in angular relation with the main stream and also agitating the fibers entrapped by the screen for aiding removal thereof.

7. Apparatus, as claimed in claim 3, in which the means for directing a rapid flow of air through the chamber comprises a blower connected by ducts and shutter arrangements with the inlet and outlet openings and adapted selectively to direct flow of the air in either direction.

8. The method of fabricating a shaped preform from discontinuous fibers separate and apart from their forming, comprising passing an air stream upwardly through a chamber containing the fibers thereby to entrain the discontinuous fibers in the air stream, imparting turbulence to the air stream responsive to elements contained within the chamber more uniformly to distribute the fibers entrained in the air stream, passing the air stream through a foraminous member which is shaped to the contour of the preform whereby the entrained fibers are filtered from the air stream passing through the foraminous member to collect as a uniform layer in haphazard and intermatted relation on the member wall and separating the deposited layer of fibers as a preform from the foraminous member.

9. The method of fabricating a shaped preform of relatively short discontinuous fibers comprising entraining the fibers in a turbulent air stream within a closed chamber to cause the fibers to be carried principally in a direction opposed to gravitational flow, providing a stationary foraminous member shaped to the desired contour at the outlet at the upper end portion of said chamber, passing the air stream through the foraminous member which separates the fibers in haphazard intermatted relation on the member to form a uniform layer which is separable therefrom as a preform, and then removing the preform from the foraminous member.

10. The method of preparing a shaped preform of discontinuous glass fibers comprising the steps of circulating an air stream through a chamber from the inlet at the lower end to an outlet at the upper end, entraining glass fibers in the air stream, providing a plurality of auxiliary gaseous streams intermediate the inlet and outlet to impinge upon the fiber entraining air stream passing through the chamber to impart greater turbulence thereto, separating the fibers from the air stream as a uniform matted layer by a screening member of predetermined shape arranged to obstruct the outlet, and intermittently stopping the circulation of air to permit removal of the layer of glass fibers as a preform from the screening member.

11. The method of preparing a shaped preform of discontinuous glass fibers comprising the steps of circulating an air stream through a chamber from an inlet at the lower end to an outlet at the upper end, entraining glass fibers in the air stream, barring the free passage of the fiber entraining air stream through the chamber by a foraminous member extending centrally partially across the chamber to increase the turbulence of the air stream and effect further separation of the fibers, separating the fibers from the air stream as a uniform matted layer by a stationary screening member of predetermined shape disposed in the outlet, and intermittently removing the layer as a preform from the screening member.

12. The method of preparing a shaped preform of discontinuous glass fibers comprising the steps of circulating an air stream through a chamber from the inlet at the lower end to an outlet at the upper end, entraining glass fibers in the air stream, barring the free passage of the fiber entraining air stream through the chamber by a foraminous member extending centrally partially across the chamber to increase the turbulence of the air stream and effect further separation of the fibers, separating the fibers from the air stream as a uniform matted layer by a screening member of predetermined shape arranged to obstruct the outlet, intermittently stopping the circulation of air to permit removal of the layer of glass fibers as a preform from the screening member, and intermittently stopping the air stream to permit the fibers collected on the underside of the foraminous member to become separated therefrom.

13. The method of preparing a shaped preform of discontinuous glass fibers comprising the steps of circulating an air stream through a chamber from the inlet at the lower end to an outlet at the upper end, entraining glass fibers in the air stream, barring the free passage of the fiber entraining air stream through the chamber by a foraminous member extending centrally partially across the chamber to increase the turbulence of the air stream and effect further separation of the fibers, providing a plurality of auxiliary gaseous streams intermediate the inlet and outlet to impinge upon the fiber entraining air stream passing through the chamber to impart greater turbulence thereto, separating the fibers from the air stream as a uniform matted layer by a screening member of predetermined shape arranged to obstruct the outlet, intermittently stopping the circulation of air to permit removal of the layer of glass fibers as a preform from the screening member, and intermittently stopping the air stream while directing auxiliary gaseous streams angularly onto the foraminous member to remove the fibers which have collected thereon.

14. Apparatus for fabricating a preform of discontinuous glass fibers in haphazard arrangement comprising an enclosing chamber having air outlet and inlet openings at the top and bottom respectively, a foraminous member corresponding in contour to the shape of the desired preform adapted replaceably to cover the outlet opening, means for supplying glass fibers to the chamber, means for directing a rapid flow of air through the chamber from the inlet through the outlet opening, means for imparting turbulence to the rapidly moving air within the chamber whereby the fibers are entrained and carried in the direction toward the outlet opening to be deposited on the foraminous member as the air passes therethrough to the outlet, and auxiliary rotatable air jets within the chamber for directing air streams in angular relation to the fiber entraining air stream to generate greater turbulence.

15. Apparatus for fabricating a preform of discontinuous glass fibers in haphazard arrangement comprising an enclosing chamber having air outlet and inlet openings at the top and bottom respectively, a foraminous member corresponding in contour to the shape of the desired preform adapted replaceably to cover the outlet opening, means for supplying glass fibers to the chamber, means for directing a rapid flow of air through the chamber from the inlet through the outlet opening, means for imparting turbulence to the rapidly moving air within the chamber whereby the fibers are entrained and carried in the direction toward the outlet opening to be deposited on the foraminous member as the air passes therethrough to the outlet, a second foraminous member disposed across the enclosing chamber in spaced relation with the walls intermediate the outlet and inlet openings to aid in the distribution and separation of the fibers and to generate greater turbulence in the fiber entraining air stream, and a plurality of rotatable air jets spaced along the underside of the second foraminous member for directing auxiliary air streams upon the foraminous member and into the fiber entraining air stream.

16. Apparatus for fabricating an intermatted mass of glass fibers of predetermined shape comprising an enclosing chamber having gaseous outlet and inlet ports at the top and bottom respectively, a stationary foraminous member of a predetermined shape adapted replaceably to cover said outlet opening, means for supplying glass fibers to the chamber, means for directing turbulent gaseous flow from the inlet through the outlet port of the chamber whereby the glass fibers are entrained and carried by the gaseous medium in the direction opposed by gravitational forces to be deposited in an intermittent mass on the foraminous member as the gaseous medium passes therethrough to the outlet.

GUSTAVE W. BORKLAND.

REFERENCES CITED

The following references are of record in the file of this patent:

UNITED STATES PATENTS

| Number | Name | Date |
|---|---|---|
| 145,262 | Wharton | Dec. 2, 1873 |
| 230,833 | Starr | Aug. 3, 1880 |
| 1,649,335 | Brecht et al. | Nov. 15, 1927 |
| 1,786,669 | Manning | Dec. 30, 1930 |
| 1,848,832 | MacKinnon | Mar. 8, 1932 |
| 2,152,901 | Manning | Apr. 4, 1939 |
| 2,230,270 | Simpson | Feb. 4, 1941 |
| 2,257,112 | Forster | Sept. 30, 1941 |
| 2,277,042 | Clark | Mar. 24, 1942 |
| 2,319,666 | Drill | May 18, 1943 |
| 2,357,392 | Francis, Jr. | Sept. 5, 1944 |
| 2,463,759 | Fitch | Mar. 8, 1949 |